(12) United States Patent
Bartel (10) Patent No.: US 8,799,106 B2
(45) Date of Patent: Aug. 5, 2014

(54) SYSTEM AND METHOD FOR ASSISTING ONLINE PRODUCT RESEARCH BY CONSUMERS

(75) Inventor: Holger Bartel, Mountain View, CA (US)

(73) Assignee: Travelzoo, Inc., New York, NY (US)

( * ) Notice: Subject to any disclaimer, the term of this patent is extended or adjusted under 35 U.S.C. 154(b) by 663 days.

(21) Appl. No.: 11/382,030

(22) Filed: May 6, 2006

(65) Prior Publication Data
US 2007/0260526 A1 Nov. 8, 2007

(51) Int. Cl.
*G06Q 30/00* (2012.01)

(52) U.S. Cl.
USPC ............... 705/26.35; 705/26.1; 705/26.61; 705/26.64; 705/26.9

(58) Field of Classification Search
USPC .................... 705/26, 27, 26.1–27.2
See application file for complete search history.

(56) References Cited

U.S. PATENT DOCUMENTS

| | | | |
|---|---|---|---|
| 6,269,361 B1 | 7/2001 | Davis et al. | |
| 6,539,392 B1 | 3/2003 | Rebane | |
| 2002/0077871 A1* | 6/2002 | Udelhoven et al. | 705/5 |
| 2002/0099642 A1* | 7/2002 | Schwankl et al. | 705/37 |
| 2003/0130983 A1* | 7/2003 | Rebane | 707/1 |
| 2003/0208387 A1 | 11/2003 | Russell et al. | |
| 2006/0106655 A1* | 5/2006 | Lettovsky et al. | 705/6 |
| 2006/0190328 A1* | 8/2006 | Singh et al. | 705/14 |
| 2006/0265361 A1 | 11/2006 | Chu | |
| 2007/0106659 A1* | 5/2007 | Lu et al. | 707/5 |
| 2007/0143155 A1* | 6/2007 | Whitsett et al. | 705/5 |
| 2008/0091482 A1 | 4/2008 | Whitsett et al. | |

FOREIGN PATENT DOCUMENTS

| | | |
|---|---|---|
| WO | WO00/46732 | 8/2000 |
| WO | WO2007/130112 | 11/2008 |

OTHER PUBLICATIONS

"Shopping around", Retzlaff, Heather. Catalog Age; Jan. 2005; 22, 1, ProQuest Central. p. 0_1. Retrieved viw ProQuest on Feb. 23, 2014.*
International Preliminary Report on Patentability and Written Opinion of the International Searching Authority (ISA) in International Application PCT/US2006/033450, ISA US Commissioner for Patents, Nov. 20, 2008, 5 pages.
International Search Report and Written Opinion of the International Searching Authority, ISA/US, for PCT/US06/33450 mailed Jul. 30, 2008, 9 pages.
Non-Final Office Action in U.S. Appl. No. 12/350,157, mailed Jan. 25, 2010, 14 pages.

* cited by examiner

*Primary Examiner* — Michael Misiaszek
(74) *Attorney, Agent, or Firm* — Mahamedi Paradice LLP (57) ABSTRACT

Rating information is maintained that is associated with one or more sources from which a product of interest can be purchased. Search criteria is received from a user that defines a product of interest. A plurality of sources are selected from which the user can transact for a product that satisfies the search criteria based at least in part on the rating information associated with one or more sources in the set. One or more sources can be determined from the rating information that have an acceptable rating value, or alternatively, a higher rating value than other sources in the set. A plurality of links may be displayed that individually locate a corresponding one of the plurality of sources. The plurality of links may be positioned, for example, based on the referral compensation provided by the sources of one or more of the links. The link that identifies the source with the highest or higher rating values may be identified to the user.

13 Claims, 4 Drawing Sheets

SYSTEM AND METHOD FOR ASSISTING ONLINE PRODUCT RESEARCH BY CONSUMERS

TECHNICAL FIELD

The disclosed embodiment relate generally to the field of online research. More particularly, embodiments described herein relate to a system and method for assisting online product research by consumers.

BACKGROUND

The Internet has enabled numerous online searching sites for which individuals can search for products and services. While the Internet provides convenience, online transactions lack personal contact and human interaction. Often, feedback from other consumers or users is valuable to an individual in marking purchasing decisions.

In the travel industry, numerous web sites exist for persons to make reservations and bookings. For airfare, for example, airlines typically have online sites that an individual can use to search for fares and purchase tickets. At the same time, numerous online travel agents exist, some of which combine data and fares from numerous airlines. These sites give the individual numerous choices, and can provide overlapping products and services.

DETAILED DESCRIPTION

Embodiments described herein assist a person in online research of produces. Numerous online sources exist by which individuals can research, purchase, reserve or otherwise transact for products, such as those provided by the travel industry. Embodiments described herein facilitate an individual to select an online source for researching and purchasing such products. In one embodiment, rating information is accumulated and displayed to the user in some form to indicate sources that have good feedback for the products the user is seeking.

In another embodiment, information about the products that individual sources provide is used as a factor in determining what sources should be most prominently displayed or otherwise made available to the user. In particular, products (as listed on sites or provided with databases) may be inspected for characteristics that are known or otherwise designated to be desirable to the general population. Sources that provide these products are then selected for display and/or prominence.

According to one embodiment, rating information is maintained that is associated with one or more sources from which a product of interest can be purchased. Search criteria is received from a user that defines a class of products that are of interest. A plurality of sources is selected from which the user can transact for an item that satisfies the search criteria based at least in part on the rating information associated with one or more sources in the set. One or more sources can be determined from the rating information that has (i) a highest rating value, (ii) a higher rating value than other sources, or (iii) a rating value that is above a minimum threshold (e.g. the minimum rating deemed to be "good"). A plurality of links may be displayed that individually locate a corresponding one of the plurality of sources. The plurality of links may be positioned, for example, based on the referral compensation provided by the sources of one or more of the links. The link that identifies the source with the highest rating value may be identified to the user. Alternatively, links may be provided to one or more sources that have a higher rating value than other sources, or a rating value that is above a minimum threshold.

As used herein, the expression "highest rating value", "highest value" or similar expressions means that which has the best or most desirable rating. Similarly, "better rating" or "higher rating" means that which has a more desirable rating than something else.

In another embodiment, rating information is maintained that is associated with one or more sources from which a product of interest can be purchased. A search criteria may be received from a user. Products may be identified that match or satisfy the search criteria. One or more products that share a designated characteristic may be identified. The designated characteristic may be indicative that the one or more products are more desirable than other products that are available. A plurality of sources for the identified products may be identified, where each source enables an individual to transact for one or more the products that share the designated characteristic. Some, but not all of the sources may be selected based at least in part on the rating information associated with the selected sources. A plurality of links may then be displayed. Each link may be selected or acted on by the user to locate a corresponding one of the selected sources.

With regard to such an embodiment, variations provide for displaying features indicating prominence to designate a determination of desirability, wither for the user to select a particular source or for the referring party to have the user select the source. For example, an icon or other object may be displayed to communicate a source for the products as having a high (e.g. above a threshold, or above other sources) or highest value (e.g. the best rating value). Likewise, the arrangement of links may be provided so that the most prominent position is given to the source with the highest referral fee.

As used herein, the term "product" applies to fares, bookings, services, and other products or services that are available to a consumer. Products includes items that can be purchased or reserved, depending on what the product is (e.g. airfare) and rules that apply for acquisition of the product by the consumer. With reference to the travel industry, product may include fares (airline, train, cruise line, bus etc.), lodging, local destination transport (e.g. car rental), organized travel services (e.g. guided expedition), travel packages that combine different types of services, travel products (airfare, train fare, bus fare, cruise fare, car rental and hotel accommodations), reservations (with or without booking) and various other products/services and variations thereof. While embodiments described herein are described with greater focus on travel products and fares, other embodiments may apply to other types of products. For example, embodiments described herein may apply to books or consumer electronics.

Furthermore, one or more embodiments pertain to a computer-implemented interface that can be provided from a web site or other network resource. According to an embodiment, the interface may include a search component and a display component. The search component is configured to receive a user's search criteria. The display component is configured to be responsive to the user entering the search criteria. The display component generates a list containing a plurality of sources from which the user can make a selection to research products that match the user's search criteria. The display component generates a list containing a plurality of sources from which the user can make a selection to research products that match the user's search criteria. The display interface may identify to the user one or more sources from the plurality of sources that have either has a higher rating value than other sources in the plurality of sources, or that have a rating value is greater than a rating threshold.

A used herein, "compensation" means any form of consideration, including funds, the providing of services or benefits, or the exchange of services.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below (such as with FIG. 1 or FIG. 2) provide examples of processing resources and computer-readable mediums on which instructions for implementing embodiments of the invention can be carried and/or executed. In particular, the numerous machines shown with embodiments of the invention include processor(s) and various forms of memory for holding data and instructions. Example of computer-readable mediums include permanent memory storage devices, such as hard drives on person computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Overview

Figure 1:
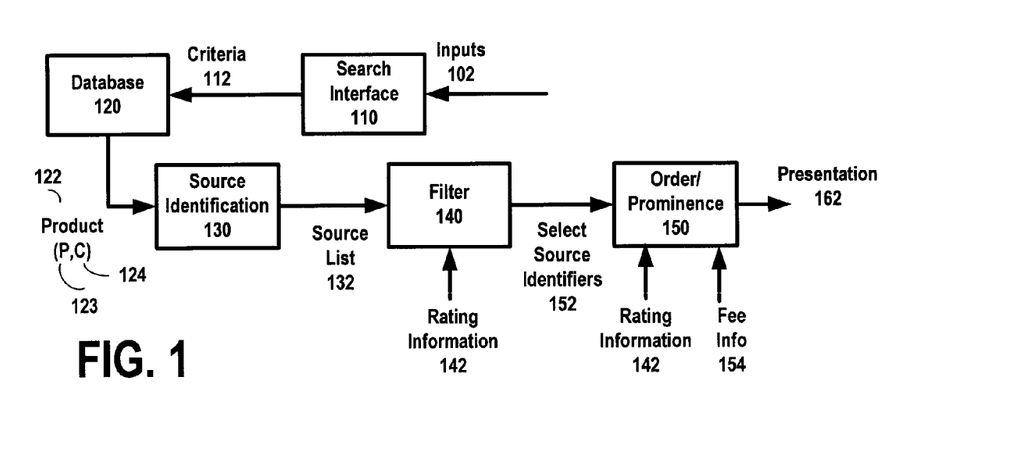
FIG. 1 is a data flow diagram for assisting online researching of products by consumers, according to one or more embodiments of the invention.

FIG. 1 is a data flow diagram for assisting online researching of products by consumers, according to one or more embodiments of the invention. In FIG. 1, processes, or components that run such processes, may be interconnected over a network, on interconnected machines, or on one server or connected computing device. A search interface process 110 may execute to enable a user to enter inputs 102. Under one implementation, the search interface process 110 executes on a server, and renders a page or web interface that includes user-interface features by which the user can select and enter inputs 102. As described with, for example, FIG. 5, the features may be in the form of menu selection items, active icons, text fields and check boxes, although numerous other kinds of interfaces are also contemplated.

Upon receiving the inputs 102, the search interface 110 defines a criteria 112 that can be compared against product descriptions of a database 120. In one embodiment, the search interface 110 communicates criteria 112 in the form of a query. The criteria 112 translates the user's input actions into fields that match or have correspondence to the fields of the database 120.

The submission of the criteria 112 to the product database 120 results in the identification of a plurality of items 122 that satisfy the criteria. According to an embodiment, items 112 may specify providers 123 of the products, as well as one or more designated characteristics 124. The designated characteristics 124 may include information about the products 122 that can be subsequently used to identify, or at least weight, some items as more preferable than others.

A source identification function 130 may be performed on the products 122 that are provided from the product database 120. The source identification function 130 identifies a list of sources 132 for the items 122, from which the user can access and use in order to transact for the individual items. In some cases, information contained in the database 120 may be used to identify some of the sources that provide those specific items. In other cases, existing information or knowledge may be used to correlate items 122 with sources. Examples of sources include online sites where a person can reserve, purchase or put on lay-away a desired product or item from the database 120. In the case where the product corresponds to airfare, for example, the source for the airfare fare may include (i) the web site of the airfare, and/or (ii) an on line travel agent (e.g. such as provided on www.orbitz.com) that is known to enable reservations and bookings through for that airline. These sources can be identified because the items 122 identify the carrier, and knowledge can map the carrier identification to web sites that enable transactions for those carriers.

A filter 140 may sort through the source list 132, and information provided from the items 122 and database 120 in order to select, from all the sources identified in the product database 120, a set of sources. The set of sources are those that will be made readily available to the user. In one embodiment, only the select set of sources are made available to the user. In another embodiment, other sources that are not in the selected set are also made available, but non-selected sources are less prominently displayed or otherwise not as readily available for use to the user. According to an embodiment, the output of the filter 140 corresponds to identifiers for the selected set of sources ("select source identifiers 152").

In order to make the selection, the filter 140 may utilize rating information 142 that is maintained and associated with the various sources that are identified with the items 122. In one embodiment, the rating information 142 may be obtained from a rating population. The rating population may include past users, who have individually provided feedback as to which sources where preferred or actually used by that user. As such, the rating information 142 that is used may be specific to (i) the source of an individual item or product, and (ii) some or all of the criteria. For example, in the case of travel fares, the user's search criteria may specify departure and destinations sites. The rating information 142 used to implement the filter 140 may be associated with the past users who selected or preferred a particular source for purchasing a fare for the same destination and departure sites. As a variation, the rating information 142 may be specific to users who selected or preferred a particular source for purchasing a fare to the same destination site, or from the same departure site, or a fare the includes the particular departure and destination site in any combination. Numerous other possibilities are also contemplated as to how rating information 142 may be established and used with one or more embodiments described herein.

In addition to using rating information 142, one or more embodiments provide that the filter 140 is based at least in part on the designated characteristic(s) 124 of the items 122. For example, the designated characteristic 124 may correspond to price, and if the price of some products may exceed other products by a large amount, the filter 140 may automatically exclude any source that exclusively provides only the items that correspond to the expensive products. In the case of airfares, the designated characteristic 124 may correspond to identification of non-stop flights, one-stop flights, or a duration of the travel time. In making a selection of some sources over others, one implementation provides that filter 140 may consider and give preference to sources that make available items that are deemed desirable (e.g. non-stop flights are deemed more desirable than multi-stop). As another example, an implementation may exclude all sources that provide only multi-stop fares.

The number of sources identified by select source identifiers 152 may have any upper threshold limit. For example, filter 140 may be limited in the total number of sources that it can select or filter. In such a scenario, if the number of sources that can be displayed to the user exceed the total number, some sources are filtered out and not included in the select source identifiers 152. In another embodiment, filter 140 has no limit or designated number of sources that is to select, but rather filters out sources based on other criteria, such as rating information 142 (poorly rated sources are not displayed), or designated characteristic 124 (e.g. display only non-stop flights or do not display most expensive items). Thus, filter 140 can display identifiers to as many sources as qualify, given criteria and thresholds established by rating information 142 and the designated characteristics 124.

In one embodiment, the select source identifiers 152 are communicated to an order/prominence component 150. The order/prominence component 150 makes determinations as to which individual source identifier(s) is to receive prominence or otherwise made distinguishable or of focus to the user. The prominence may come in various forms. Under one implementation, the prominence may be in the form of positioning of source identifies relative to one another. For example, in a vertical list presentation, the top most position may be regarded as the most prominent position. The prominence may also come in the form of visual differentiation of the identifies (e.g. links) to one or more of the sources from other sources. The visual differentiation may correspond to, for example, the display of graphic features or other visual indicia, as well as the coloring, size and spacing of one link over another. In the case where logos are displayed as links, display of graphic features, for example, may be more effective as a distinguisher. Numerous variations to how order/prominence component 150 provides prominence to one or more of the select source identifiers 152 are also contemplated, some of which are described elsewhere in this application. The result of order/prominence component 150 is a presentation 162, which includes the select source identifiers 152 with different prominence characteristics, as implemented by the order/prominence component 150.

In one embodiment, the order/prominence component 150 receives information 154 of a referral compensation fee for each source identified by the select source identifiers 152. The order/prominence component 150 may make a prominence decision based in the information 154. As an example, the identifier to the source that is known to have the highest referral compensation fee (as known from information 154) may be provided the position that is deemed the most prominent position relative to the identifiers of the other sources in the set of select source identifiers 152. This may correspond to, for example, the top-most position in a list where the identifiers of the select source identifies 152 are provided. The highest referral compensation fee foes not necessarily have to be determinative. For example, the identifier to a source with a referral compensation fee above some threshold, or better than others, may be provided the priority position.

In another embodiment, the order/prominence component 150 receives the rating input 142 to make another determination as to prominence. In one embodiment, for example, the source with the highest rating value, as determined from the rating information, may be provided a prominence feature in a list of identifiers for the selected sources. Alternatively, similar prominence features may be provided to multiple sources with a rating value that is higher than other sources, or which each have a rating value that is above a minimum threshold. The rating value may be determined from rating information associated with each of the selected sources, and may also be particular to the some or all of the search criteria 122, as described above. In one implementation, a visual differentiation is drawn to the identifier of the source that has the highest rating value, as compared to other sources that are identified by select source identifiers 152. In another implementation, the visual differentiation is drawn to the identifier for multiple sources, each of which either have a rating value than some of the other sources, or have a rating value that is above a minimum threshold.

In an embodiment, order/prominence component 150 provides two prominence characteristics for identifiers of individual sources listed with select source identifiers 152. One prominence characteristic provided enables a service that uses data outputted from order/prominence component 150 to promote referral fees, such as can be procured through "costs per clicks". Another prominence characteristic provided enables the service to promote customer experience and assurance be managing and notifying users of desirable sources and other rating information.

System Architecture

Figure 2:
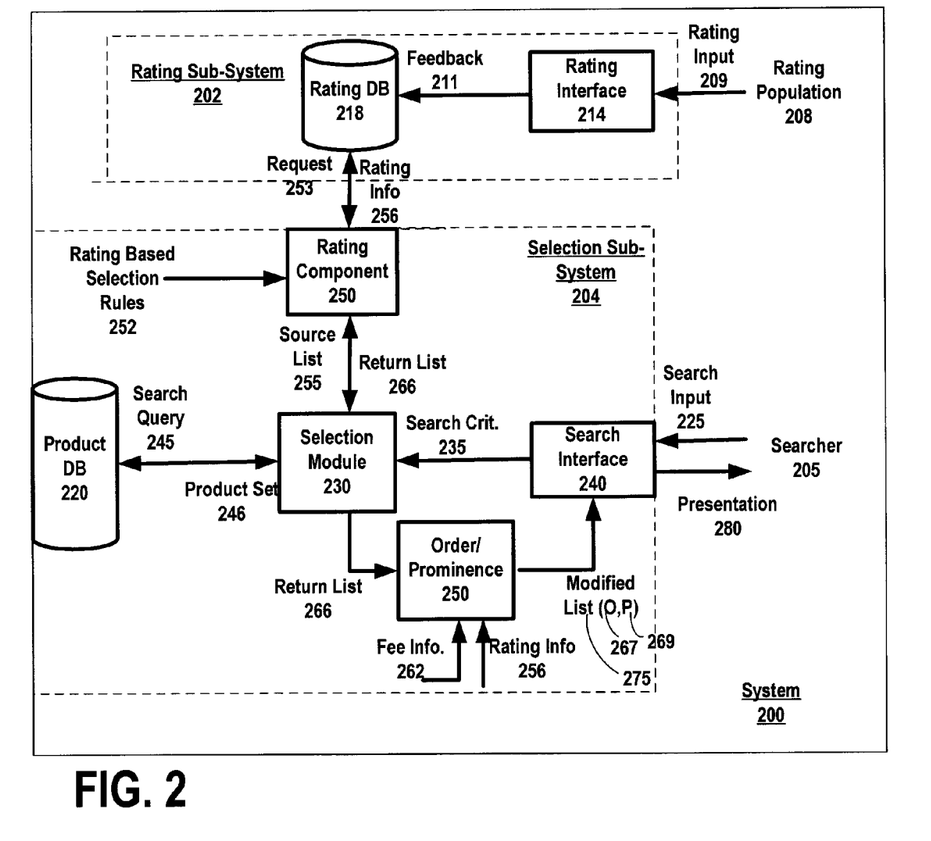
FIG. 2 illustrates an architecture for a system that provides assistance to consumers who research products online, according to one or more embodiments of the invention.

FIG. 2 illustrates an architecture for a system that provides assistance to consumers who research products online, according to one or more embodiments of the invention. A system such as described with FIG. 2 may be provided on one machine, such as server, or distributed amongst different machines. Other embodiments contemplate some functionality, components and sub-systems being remote to the larger system. For example, some of the components and functionality may be provided by different operators that communicate with one another using the Internet.

In an embodiment, a system 200 includes a selection subsystem 202 and a rating sub-system 204 that operate independently of one another. In one embodiment, the selection subsystem system 202 and the rating sub-system 204 are hosted from one site, while in another embodiment, the selection sub-system 202 and rating sub-system 204 are distributed to multiple sites, and even provided by different operators. The selection sub-system 202 provides components and functionality for assisting a searcher 205 to select a source from which an item from a given product can be selected, purchased, reserved, or otherwise transacted. In one embodiment, the selection sub-system 202 provides the user with a listing of sources, with one or more prominence characteristics that focus the searcher 205 on some items on the listing over others. The rating system 204 enables feedback to be incorporated into providing the searcher 205 with assistance for selecting the source from which the product can be transacted.

FIG. 2, rating sub-system 204 includes a rating interface 214 and a rating database 218. The rating interface 214 prompts individual users in a rating population 208 for input 209. The rating interface 214 record input from the population as feedback 211, which it records in the rating database 218. The rating population 208 may correspond the users who in the past were provided an opportunity to give feedback about sources that were preferred or selected for research or use when the particular user of the rating population was seeking a particular product or type of product. For example, in one embodiment, the system 200 may provide its functionality as a feature on a site for researching sources for products of a particular type or criteria, and the individual users correspond to people who in the past used the feature. Rating interface 214 may prompt select users to enter an input indicating what site or source for products the particular user preferred or selected when researching or transacting for a particular item.

In one embodiment, the rating database 218 collects feedback 211 that correlates to selections or preference designations of past users that comprise the population 208. As such, the feedback 211 from a given user may simply indicate which link was preferred or used by the individual, rather than information that would indicate a degree (e.g. rating from one to ten). In such an implementation, the accumulation of feedback 211 for a given source or site may be simply a count of the number of selections that source received over other sources.

While an embodiment such as described above provides for the use of rating information that is based on direct user-input, one or more embodiments contemplate rating information that is indirectly provided. For example, rating information may be based on observing user-behavior, and recording actions of the user as a preference. These preferences may then be translated to rating information.

In an embodiment, selection sub-system 202 includes a product database 220, a selection module 230, a search interface 240, a rating component 250, and an order/prominence component 260. The product database 220 holds information that is routinely updated about products available for purchase or reservation. In one implementation, product database 220 maintains information about airfares, and information is updated routinely to provide information about offerings, availability and pricing. In one embodiment, data used to populate database 220 comes from a third party, such as INNOVATA LLC of Buford, Ga. for when airfares are used. The search interface 240 may incorporate the structure and fields of the database 220 to guide the user into entering search input 225. The search input 225 specifies information about the products that the user desires to research. The search interface 240 correlates the search input 225 into search criteria 235. Selection module 230 communicates with the product database 220 to formulate a query 245 based on search criteria 235. The selection module 230 uses the query 245 to retrieve a set of products 246 that satisfy the user-specified criteria. For example, the search interface 240 may prompt the user to specify departure and destination sites, as well as departure and arrival dates (assuming round trip travel). The selection module 230 may query the database 220 to retrieve airfares that have criteria of having the same departure and destination dates, and the departure and arrival dates.

Selection module 230 may determine a list of sources that the user can access to purchase a product that satisfies the user's criteria. In one embodiment, the sources are online sites. The selection module 230 may includes knowledge and/or intelligence to determine sources from which an individual can transact for products identified and returned form the database 220 in response to the query 245. For example, in the case of airfares, selection module 230 may know the website for the airlines that provide a given airfare, as well the website for any online travel agents that provide services for the same airline.

In an embodiment, the selection module 230 communicates a source list 255 of online sites to the rating component 250. In one embodiment, the rating component 250 retrieves rating information 256 using a request or query 253 that specifies criteria 225 and source identifiers from the list 255. The rating component 250 has access to rating information 256 about individual sources in the source list 255. The rating component 250 may implement a set of rules 252 using the rating information 256 of specific sources to filter sources from the source list 255.

Alternatively, the rating component 250 may use the set of rules 252 to rank sources identified in the list 255. In one embodiment, some or all of the rating information 256 is also specific to the products and/or the criteria specified by the user. For example, in the case of travel fares, rating information 256 may be specific to a particular provider of transport between the specified departure and destination sites. The rating component 250 provides a return list 266 that may modify the original list 255 by one or more of the following: (i) remove some sources (filter rules), or (ii) weight or prioritize some sources over other in the list 255.

In one implementation, the set of rules 252 implement a filter by requiring threshold criteria of the rating information 256 for a particular source in order for that source to be included in the return list 266. For example, if a source in list 255 has the lowest rating, or if the source has a rating that is less than a designated threshold, the filter rulers may specify that identifier to the particular source is omitted, reduced in priority, or otherwise not selected for recommendation or prominence. For example, such a source may still appear in the end presentation, but it may be seen in a drop down menu, or in a low-prominence position. Alternatively, such a source may be omitted, de-prioritized or otherwise not recommended if other conditions are met (e.g. there are six other sources for a particular product). Another rule may specify that the source (or source for product matching the user criteria) must have (i) received user-feedback in a specified given duration (e.g. one week), or (ii) have received a specified totality of feedback in a given duration. Numerous other alternatives are possible. Furthermore, while examples provided above describe rating rules 252 for use in filtering items from list 255, other embodiments may use the same rules to modify the priority, order or presentation of the list using implementation of the same rules.

Figure 5:
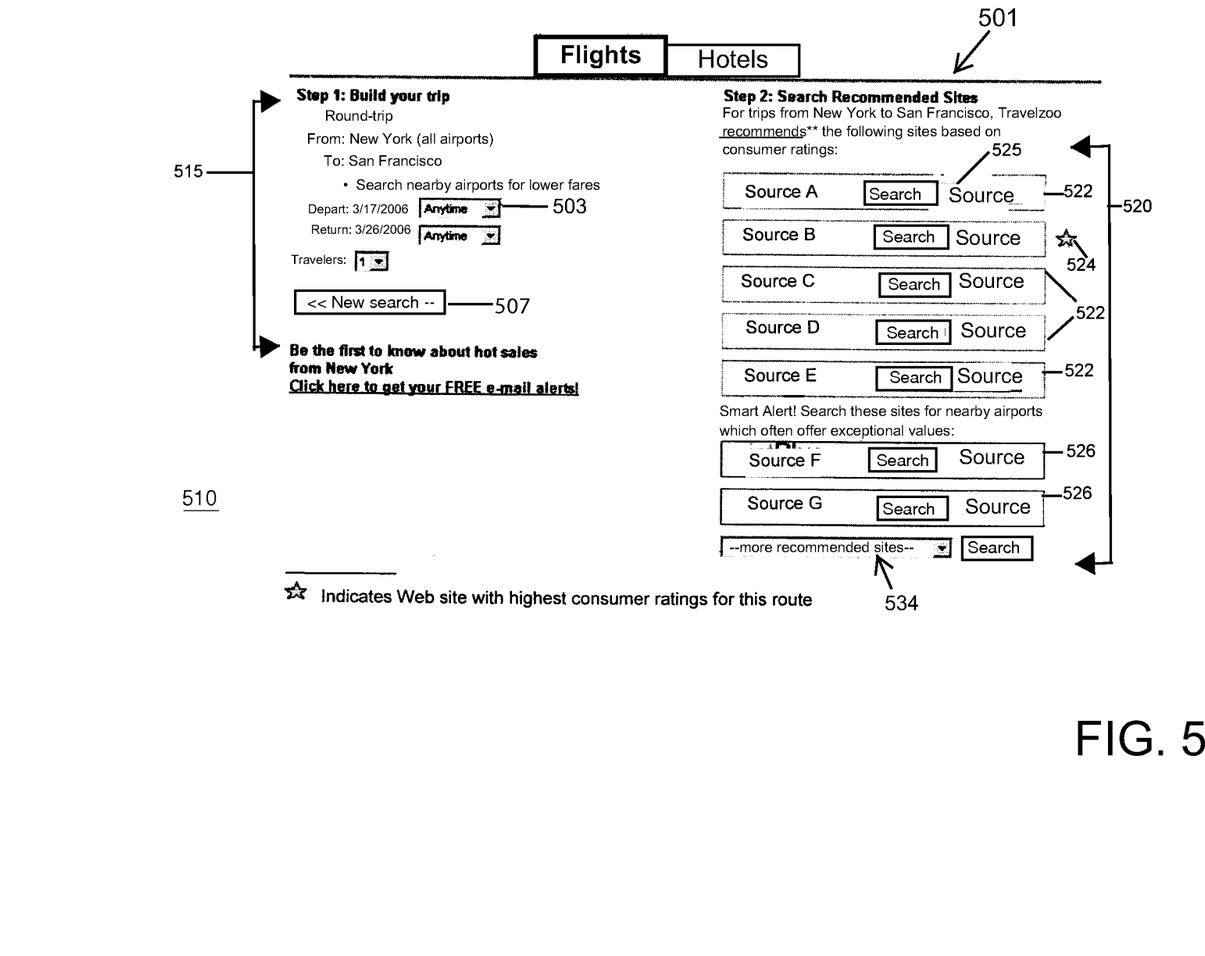
FIG. 5 illustrates a user-interface for providing functionality as described with one or more embodiments of the invention.

According to an embodiment, the returned list 266 is communicated to the order/prominence component 260, which then incorporates ordering and prominence features in how identifiers for sources in the returned list 266 are to be listed. As described with FIG. 1, different prominence characteristics may be implemented for the items in the returned list 266, using different criteria. In one implementation, order/prominence component 260 accounts for compensation that the operator of system 260 is to receive for either listing the identifier of a given one of the sources, or for referring the user to that source (e.g. "Cost per click"). To this end, the order/prominence component 260 may receive fee input 262 as to an agreed compensation level that the operator of the system shown in FIG. 2 is to receive for the user "clicking" onto a corresponding source. As shown by FIG. 5, prominence for compensation may be accommodated by ordering of the identifiers in the list of sources that are to be presented to the user. Other implementations may provide for prominence using placement, ordering, position, formatting, style and other features.

In addition, an embodiment provides for order/prominence component 260 to display one or more source identifiers in the returned list 266 differently than other source identifiers based on rating information 256 associated with the particular source(s). In one embodiment, order/prominence component 260 may use rating information 256 to determine the highest rated source identified by the returned list 266. The highest rated source may be separately identified or indicated to the user. In one embodiment, the highest rate source is communicated with an icon or other graphic feature (e.g., placement of a star), although other embodiments contemplate the use of other prominence factors, such as placement, ordering, position, formatting, style and other features. As an alternative to the highest rated source, multiple sources may be identified. Sources identified may be a cluster of the highest rated sources, or those sources which have a rating value that is above a minimum threshold.

An output of the order/prominence component 260 may correspond to a modified list 275 that has identifiers to sources selected by the selection module 230 when rating information is considered. The modified list 275 may include a first prominence characteristic 267 (e.g. ordering or position) determined or based on fee input 262. The modified list 275 may include a second prominence characteristic 269 (e.g. graphic object, icon) determined or based on rating information 256. The modified list 275 is communicated to the search interface 250, or other user-interface component, that then creates a presentation 280. In one embodiment, presentation 280 includes links to sources on the modified list 275, and graphics and information informing the user that the source for each link is (e.g. a logo). The presentation 280 may also present the links to convey the first and second prominence characteristics 267, 269. For example, the first prominence characteristic 267 may be provided with the ordering of the links, and the second prominence characteristic 269 may be provided with an icon positioned adjacent to a corresponding link in the presentation that locates the source with the highest rating.

According to an embodiment, the response to the user who is provided the presentation 280 is to make a selection of one of the links presented. A selected link locates a corresponding source from which the user transact for the product of interest. In one implementation, a browser of the user's terminal opens a new window and displays a page from the site of the source corresponding to the selected link. The page that is made available to the user may be a "home page." Alternatively, the page that is made available to the user may be an internal page that locates the product of interest, or at least progresses the user towards locating the item on the page. For example, the system 200 may communicate the user's search criteria to a search engine on the web site of the source located by the selected link.

Once the user enters his or her selection of a given source, the user may enter the rating population 208. In one embodiment, the user may randomly be selected to be queried by the rating interface 214. For example, the rating interface 214 may ask the user what link or source her preferred, selected or actually used in order to research or make a transaction for a given product. The user's input may correspond to a selection rating. Alternatively, rating interface 214 or some other component may observe what links the user selects from the presentation 280 in a given session, and provide a selection rating to each of the selected links. In either case, selection ratings may be accumulated, and the totality of selection ratings may provide the source with an overall score or value. In future instances, the score may assist the listing of the source with prominence characteristics that indicate the particular source or sources has/have the highest rating value(s) as compared to other sources that provide the same or similar product.

Methodology

Figure 3:
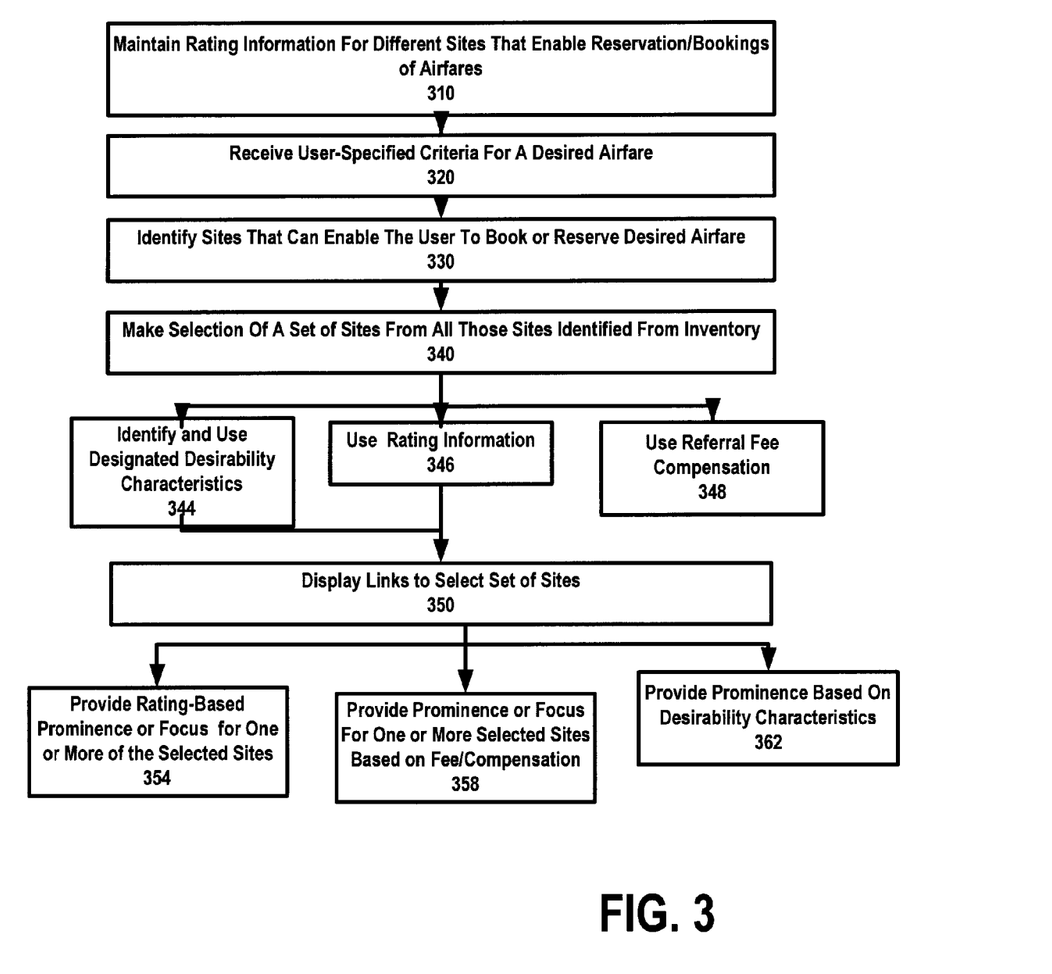
FIG. 3 illustrates a method for enabling a consumer or other user to perform online research for a product, under one or more embodiments of the invention.

FIG. 3 illustrates a method for enabling a consumer or other user to perform online research for a product, under one or more embodiments of the invention. A method such as described with FIG. 3 may be implemented using, for example, a system such as described with FIG. 1 or FIG. 2. Accordingly, reference to numerals of other figures is intended to illustrate a suitable component or element for performing a step or sub-step of a method described.

For purpose of illustrating, an embodiment of FIG. 3 is described in the context of travel fares, and more particularly airfares. As described elsewhere, one or more airfares may be used to enable individuals to research, reserve and purchase airfares from online travel agency sites and airline sites. While airfares are described by an embodiment of FIG. 3, other embodiments contemplate use of other types of products and services, including those used in the travel agency, such as lodging accommodations, rental cars, and different kinds of transport fares.

In FIG. 3, a step 310 maintains rating information about individual sites that offer airfares to individuals for bookings and reservations. There are several sites that offer consumers the ability to research, reserve and book travel fares, such as www.orbitz.com and www.travelocity.com. The rating information may be received and compiled from numerous individuals. In one implementation, each individual supplies a selection or preference input, which means the user preferred or selected a given site. In another embodiment, the rating information may reflect more information, such as a score or survey questionnaire completed by individuals in the rating population.

While an embodiment described with FIG. 2 illustrates the database 218 residing on an overall system where a method such as described with FIG. 2 is predominantly performed, other embodiments may provide for rating information to be accessed from other remote sources. For example, the rating database 218 that maintains the rating information from the population may be incorporated in a third-party service.

In step 320, user input specifies criteria for a desired airfare. The input may specify departure site, destination site, date of travel (departure and arrival date) and other information, such as preferred airline, and type of seating (e.g. business class). As described with FIG. 2, the user-input may be entered through the search interface 240 and used by one or more selection processes or components to select matching airfares from a database of products. Accordingly, in step 330, the system identifies sites that can enable the user to book or reserve airfare that matches the user's criteria. These sites may correspond to online travel agents (e.g. www.orbitz.com) and sites operated directly for airlines.

In step 340, selection is made of a set of sites from all those sites identified in step 330. Under one implementation, the selection may be made based on a threshold number of sites that can be in the set. If there are fewer identified sites that the threshold number, then the step of making the selection of step 340 means all sites identified in step 330 are selected. If however, there are a greater number of identified sites in step 330 than the threshold number of sites, then some of the sites from step 330 are omitted from the selection made in this step. Thus, for example, if the set permits up to 7 sites, and step 330 returns 12 sites that the user can research to transact for the desired airfare, then 5 sites are omitted from the selected set of sites. Accordingly, some criteria or logic may be used to determine which of the sites identified from the products are ore desirable to a general audience, as well as perhaps to the site on which a method as described is performed.

Accordingly, the system 200 may select the set of sites by determining one or more desirability factors for each site. In one embodiment, a sub-step 344 is performed to select one or more sites that have one or more designated desirability characteristics. The designated desirability characteristics include any characteristic of an airfare or other product that is deemed to make one product more desirable than another without that characteristic. In the context of airfares, desirability characteristics include the number of stops the airfare has between the departure and destination sites (e.g., "non-stop" flights are more desirable than "one-stop" flights). Another example corresponds to travel time. Airfares with less travel time may be deemed more desirable. Still further, other examples include: (i) layover time, (ii) time of travel (morning flights versus redeye), (iii) airfare price, and (iv) type of seating. Numerous other desirability characteristics are possible, either for use with airfare or other kinds of products.

As an alternative or addition to sub-step 344, sub-step 346 provides for the user of rating information. Rating information associated with sites may be used to select some sites over others. For example, sites with the highest ratings (or those above a threshold) may be chosen for the selected set over other sites. Likewise, sites with the lowest ratings may be left off the selected state.

As an alternative or addition to either sub-step 344 or sub-step 346, sub-step 348 provides for the use of a referral fee. Sites with the highest referral fee compensation (e.g., "Cost per clicks") may be included in the selected set of sites. In one embodiment, the rating information is specific to the site and to the destination and departure sites. However, rating information may also be used to make the selection based on just the site, independent of the product. For example, some sites may be more favored than other, and the rating subsystem 202 (FIG. 2) may record rating information to this effect and incorporate information about those sites in making the selection for the set.

Performance of one or more of the sub-steps 344-348 may each be performed as a filtering step or as weighted parameter in a weighed selection algorithm. As a filter, one or more of the sub-steps 344-348 may establish a threshold that must be met in order for a site to be included in the selected set. As a weighted parameter, values returned by one or more of the sub-steps 344-348 be factored into an algorithm that takes into account other parameters.

Following step 340, step 350 provides that links to each site in the selected set is displayed to the user. The links may present other information, such as graphics (e.g. logos), to inform the user of the source. Each link may be selectable to open a web resource of the corresponding site, such as the home page of the site, or the page to a feature for locating the desired product or still further the page to the desired product.

The display of the links to the selected set of sources may be dome so as to convey information and focus the user on one or more of the links in the set. Various reasons and motivations may be used to provide focus and prominence to one link over another. These include (i) focusing the user on a link to a site that has the best rating or user-feedback, (ii) focusing the user on a link that provides the best compensation or referral fee for the system that shows the user the links, and/or (iii) focusing the user on the link that is deemed likely to provide the best product of interest.

Sub-steps 354, 358, and 364 illustrate different implementations for displaying the links with focus or prominence. Sub-step 354 provides for the use of rating-based prominence or focus. In one implementation, for example, the rating information for each site may be compiled into a value, and the site with the highest rating value may be provided prominence. As illustrated with an embodiment of FIG. 5, the prominence may be in the form of a displayed icon, although numerous alternatives may be employed.

As an addition or alternative to sub-step 354, sub-step 358 provides for prominence and feedback based on fee or compensation provided to the referring site (e.g. The site that is displaying the link). In an embodiment where the prominence for the rating information is provided as a graphic feature, the prominence for fee compensation may be provided more subtly, such as in the form of ordering of the links. In ordering the links to provide prominence, an assumption may be made that certain positions in the display of the links are inherent to draw the user's attention more than others. For example, in a vertical list, prominence may be provided by selecting the top most link to be the link with the best referral compensation fee.

As an addition or alternative to sub-step 354 and sub-step 358, sub-step 362 provides for prominence of airfares or travel products with the best desirability characteristics. For example, non-stop fares may be positioned higher than one-stop fares and/or provided a graphic feature or object.

Figure 4:
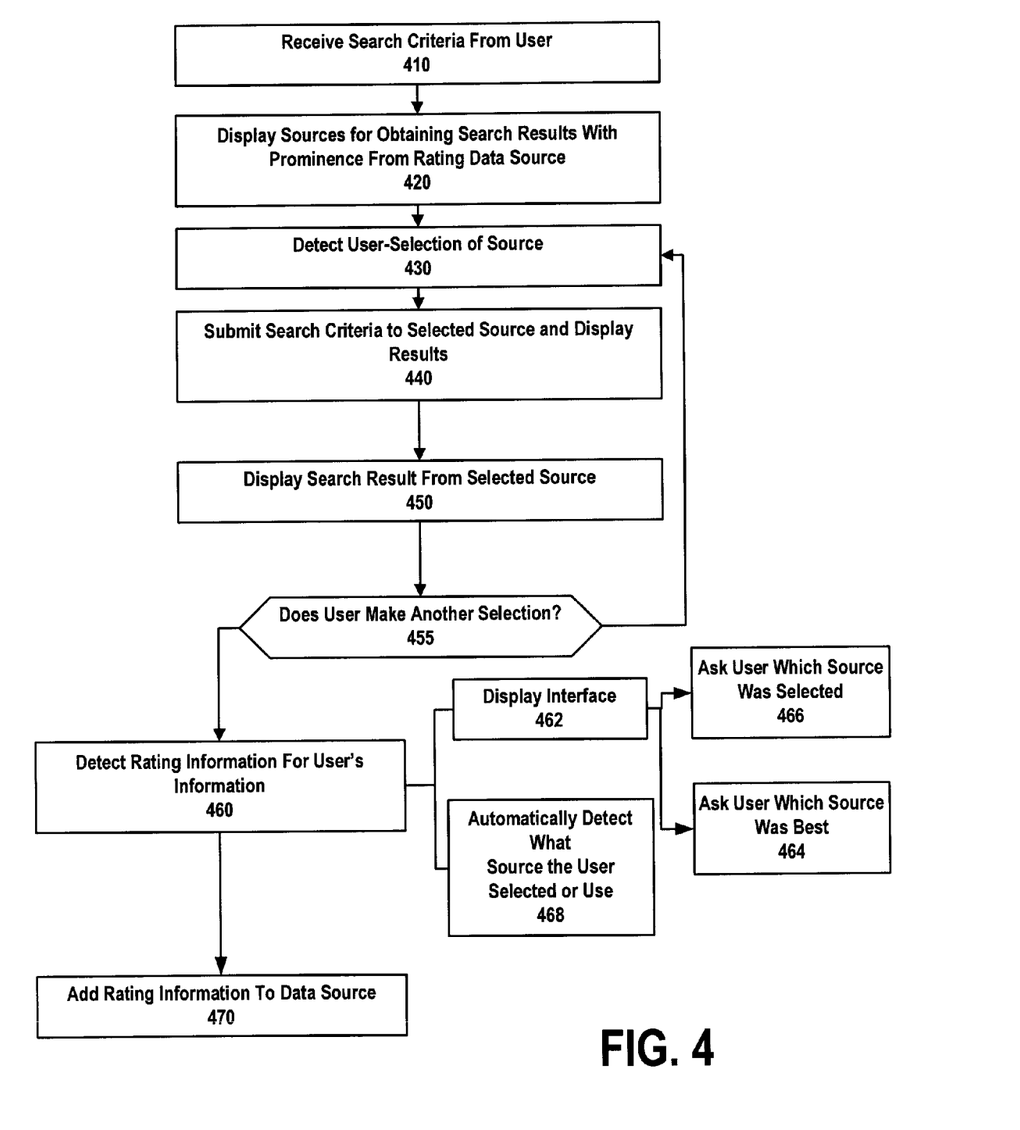
FIG. 4 illustrates another method for which rating information can be obtained and used to facilitate online products researching by individuals, under another embodiment of the invention.

FIG. 4 illustrates another method by which rating information can be obtained and used to facilitate online searching by individuals, under another embodiment of the invention. A method such as described may be used for purpose of enabling online searching of products, such as described with other embodiments described herein. For example, a method such as described with FIG. 4 may be implemented using a rating interface xx, such as described with FIG. 2. However, other embodiments contemplate other applications, such as searching for documents.

In a step 410, search criteria is received from a user. In the context of travel products, for example, search criteria may correspond to departure and destination sites, and data of travel.

In step 420, sources are displayed for obtaining search results based at least in part on rating information available from a rating data source (e.g. rating database xx in FIG. 2). The sources may correspond to sites that provide a search engine or other search functionality, where the user's search criteria can be applied to obtain a search result. The rating information used to select the sources has one or more levels of pertinence to the search criteria or results. In one embodiment, the rating information is pertinent because it is rating information others have entered for the same or similar search criteria. In addition, the rating information may provide feedback about the sources displayed to the user, particularly as to the past experience of other users. The rating information may reflect feedback from other users as to how the particular source handled the similar or same search criteria. For example, in the case of travel products, rating information may specify how different travel identified available airfare or other accommodations. Thus, the rating information may reflect the selection or pricing of the product offered for the particular criteria at a given source, as well as the case of use of a particular site.

Step 430, the user selects a source. For example, in a displayed browser window, the user may select an icon or other object that is a link to one of the listed sources.

In step 440, the search criteria of the user is carried over and submitted to the selected source. In one embodiment, the search criteria received in step 410 is programmatically submitted to a search interface of the selected source. Thus, for example, a programmatic mechanism may copy the user's search criteria in a text field of a search engine of the selected source.

Step 450, the search result from the selected source is displayed to the user. In one implementation, a new browser window is opened automatically, and the search result returned from the search engine of the selected site is displayed to the user in the new window. Numerous other variations are contemplated for this step.

In step 455, a determination is made as to whether the user makes another selection. If the user makes another selection, step 430-450 is performed the next selection. For example, embodiments contemplate that the user will want to compare the search results from multiple sites. The user may make the comparison using a new window which has the returned search result from each site.

Step 460 provides the rating information is detected from the user. In one embodiment, user's provide feedback as to their search experience. Some or all users may be selected to provide rating information. Under one embodiment, the rating information is detected through a sub-step 462, in which a rating interface is displayed to the user. Sub-step 464 provides that the rating interface may ask the user which site provided the best results. As another example, the rating interface may ask information about each selected site. As another alternative, sub-step 466 may ask the user which site he actually used, when his research was complete. In the context of product purchasing, for example, the site used would be the one from which the user made a purchase. As another alternative, sub-step 468 provides that the user's input and actions are monitored to detect what source he or she preferred. For example, the user's input may be monitored to detect whether he selected products or other search results from a given one of the sources from which search results were displayed (e.g. see step 450).

In step 470, the user's rating information is added to the rating source. The user's rating information may then the bused to select sources for other user's in the future.

User-Interface

FIG. 5 illustrated a computer-generated user-interface for providing functionality as described with one or more embodiments of the invention. As shown, a user-interface 510 may be provided through a browser window 501 operating on a computer terminal of a searcher. As such, the user-interface 510 may be generated from a server or other machine or resource on a web site where, for example, a system such as described with FIG. 3 is provided, or where a method such as described with FIG. 3 is implemented.

Under an embodiment, the user-interface 510 includes a graphic search interface 515 for enabling the user to enter a search criteria. The search criteria may be entered through the use of various user-interface features, including drop-down menus, 503, icons 507 and features not shown.

An embodiment shown by FIG. 5 assumes a state where the user has submitted the search criteria. In such a state, the user-interface 510 may display a presentation 520 on which a set of links are provided. The links provided in the presentation 520 may include links that locate selected sites that can provide the user with the ability to transact for the desired product. In the example provided, the desired product if an airfare from New York City to San Francisco, on a specified date. The links provide in the presentation also include logos and other graphics to clearly identify a source for enabling the user to purchase or transact for the airfare.

The links provided in the presentation 520 may include links 522 of a first arrangement, which are links that match the user's search criteria (i.e. airfare from New York to San Francisco on March 17, return by March 23). In an implementation shown, the first arrangement of links 522 is a vertical list, having a top or inherently most prominent position 522. Other positions may descent downward, and one premise that may be used is that each descending position is less prominent than positions above it. Once prominence characteristic that can be used with presentation 520 is to select the link for the most prominent position. Another prominence characteristic that can be used with presentation 520 is to provide a graphic object or visually identifiable content adjacent another link. The determination as to what links are to receive prominence may be based on one or more of the following criteria: (i) use the link for source with the best referral fee, (ii) use the links for the source with the highest rating value, or a rating value that is better than other sources or a minimum threshold, (iii) use other information. In presentation 520, for example, the most prominent position 525 is occupied by the source with the best referral fee. The link to the source or sources with the highest rating, on the other hand, may be provided with a graphic object 524, positioned adjacent to the link, to convey an indication of its desirability for the particular criteria. Desirability may be based on factors that include information other than rating, such as the presence of a desirable characteristic (e.g. non-stop flights for airfare products). Similarly, the order that the links are listed may be based on determinations of desirability, rating, and/or referral fee.

The presentation 520 may also provide links 526 that satisfy (but not match) the user's search criteria, but only because additional knowledge is used. For example, the system may know nearby airports to those specified by the use in the search, and then present the user with alternative links to sites for airfares that use the alternative airports. In one embodiment, the alternative links 526 may be provided with graphic objects or other prominence characteristics, if, for example, the sources of the links have the highest rating or satisfy other desirability criteria.

Under an embodiment, links to unselected sources may be made available on the presentation through a menu feature 534. With reference to FIG. 1, for example, identified in the menu feature may correspond to items in the plurality of products 122 that are not identified by select source identifiers 152. The links to these sites may be less readily available to the searcher because the searcher will need to perform extra acts to view and use links to the non-selected sites.

When the user selects one of the links in the presentation 520, one or more embodiments provide that the user's search criteria is communicated to a search function or engine at the site located by the selected link. Functionality included or integrated with the interface may programmatically submit the user's search criteria, then display or retrieve results from the site of the selected link. In one implementation, the displayed results may be provided to the user in a new window browser. In this way, the user can select multiple links form the presentation 520. If the user becomes part of the rating population, his rating input may identify which site he actually ended up using to purchase an item or make the booking. Alternatively, his rating information may identify which site returned the best result when the corresponding link was selected. Other types of rating information may also be obtained as an alternative or additional implementation feature (e.g. a rating value for each site).

While examples described above illustrate a series of events that occur in response to the user providing a search criteria, other implementations may provide that the user's search criteria may be distributed over time, with different components of the search criteria being submitted in response to interactions with the user-interface or other functionality. For example, under one implementation, the use may enter part of the overall search criteria (e.g. departure and destination sites). Results for this portion of the search criteria is returned to the user, such as by way of display of links that are known to locate sources where the particular search criteria can be satisfied. Then the user may select one of the links presented in response to the initial search criteria, and be prompted to enter more information for submitting a search query at the located site. In the case of airfare, for example, the user may initially enter departure and destination sites, then receive the presentation with listings of links. Upon the user selecting one of the links, the user may be prompted to enter more criteria for use with the selected site, such as departure and arrival dates. In response to the additional search criteria, the user receives a search result from that site. Alternatively, the user may enter the departure and destination sites, select one of the links, and then have returned a partial or complete search result based on the initial search criteria. The user can then enter another criteria (e.g. departure and/or destination dates) and have the first search refined or performed again. Numerous alternatives and variations are also contemplated.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented method for assisting online research at a website for products or services, the method being performed by one or more processors that perform steps comprising:

determining a rating value for a plurality of available online sources from which products or services can be purchased, the rating value being determined from rating feedback that is accumulated from a rating population of users of individual sources in the plurality of available online sources;

receiving, from a user of the website, search criteria that at least partially defines a product or service of interest;

determining, from the plurality of available online sources, a plurality of sources that satisfies the search criteria;

from the plurality of sources that satisfy the search criteria, determining, using the rating information, a set of one or more sources that have a highest rating value as compared to other sources in the plurality of sources;

displaying, to the user, a plurality of links that individually identify a corresponding one of the plurality of sources, so that at least some of the plurality of sources are represented by the plurality of links;

wherein displaying the plurality of links includes (i) presenting at least one link most prominently in position relative to other links in the plurality of links that are displayed, the at least one link corresponding to a source that is identified as providing a highest referral compensation for user activity originating from the website, while concurrently (ii) presenting, in prominence, using a qualitative graphic, a select set of one or more links that are individually associated with a corresponding source in the plurality of sources that have the highest rating value amongst the plurality of sources that are displayed, the select set of one or more links excluding the at least one link that is most prominently positioned relative to the other links;

wherein presenting the select set of one or more links in prominence includes (a) displaying the qualitative graphic that is representative of the highest rating value with or adjacent to only the select set of links, while (b) not displaying the qualitative graphic with links that are not in the select set.

2. The computer-implemented method of claim 1, wherein the products or services include travel products, and wherein receiving, from the user, search criteria includes receiving an input that identifies a departure site and a destination site for a particular type of travel product, and wherein determining the set of one or more sources includes using a rating value that is provided by rating feedback from a rating population for that source, and particular to the departure site and the destination site.

3. The computer-implemented method of claim 1, wherein displaying the plurality of links includes displaying at least one link to an online travel site to enable the user to purchase the product.

4. The computer-implemented method of claim 1, wherein determining a plurality of sources includes:

searching a database of airline flight routes to identify one or more airline routes between the departure site and the destination site; and identifying one or more sources that enable the user to purchase a fare for each of the one or more airline routes.

5. The computer-implemented method of claim 4, wherein identifying one or more sources includes identifying online sites for airlines and online sites for travel agents.

6. The computer-implemented method of claim 1, wherein determining a plurality of sources includes selecting the plurality of sources from the plurality of available online sources based in part on the rating value associated with at least some of the plurality of sources.

7. The computer-implemented method of claim 1, wherein positioning at least one link most prominently in position includes positioning at least one link in a designated prominent position based on the referral compensation.

8. The computer-implemented method of claim 1, wherein determining the plurality of sources that satisfy the search criteria includes:

searching a database that identifies a set of products that satisfy the search criteria, wherein the set of products are provided by multiple providers;

identifying a plurality of online sites that enable individuals to purchase the plurality of products or services provided by each of the providers; and selecting some, but not all, of the plurality of online sites as the plurality of sources for which links are to be displayed using a rating value that is associated with at least some of the online sites.

9. The computer-implemented method of claim 8, wherein determining the plurality of sources that satisfy the search criteria includes:

identifying one or more products or services in the set of products or services that share a designated characteristic that is deemed to make those products or services more desirable than other products or services in the set, and prioritizing online sites in the plurality of online sites that enable the user to purchase a given product or service with the designated characteristic.

10. The computer-implemented method of claim 9, wherein the plurality of products or services correspond to a plurality of airline routes between a departure site and a destination site; and wherein identifying one or more products or services in the set of products or services that share a designated characteristic includes identifying the airline routes in the set that are non-stop flights.

11. The computer-implemented method of claim 9, wherein the plurality of products or services correspond to a plurality of travel routes between a departure site and a destination site; and wherein identifying one or more products or services in the set of products or services that share a designated characteristic includes identifying the travel routes in the set that have the least travel time.

12. The computer-implemented method of claim 1, wherein the product or service corresponds to one or more items selected from a group consisting of: (i) airfare, (ii) automobile rental, (iii) lodging accommodations, (iv) bus fare, (v) train fare, (vi) cruise fare, and (vii) travel packages.

13. A computer-readable medium carrying instructions for assisting online research, wherein the instructions, when executed by one or more processors, cause the one or more processors to perform steps comprising:

determining a rating value for a plurality of available online sources from which products or services can be purchased, the rating value being determined from rating feedback that is accumulated from a rating population of users of individual sources in the plurality of available online sources;

receiving, from a user of the website, search criteria that at least partially defines a product or service of interest;

determining, from the plurality of available online sources, a plurality of sources that satisfies the search criteria;

from the plurality of sources that satisfy the search criteria, determining, using the rating information, a set of one or more sources that have a highest rating value as compared to other sources in the plurality of sources;

displaying, to the user, a plurality of links that individually identify a corresponding one of the plurality of sources, so that at least some of the plurality of sources are represented by the plurality of links;

wherein displaying the plurality of links includes (i) presenting at least one link most prominently in position relative to other links in the plurality of links that are displayed, the at least one link corresponding to a source that is identified as providing a highest referral compensation for user activity originating from the website, while concurrently (ii) presenting, in prominence, using a qualitative graphic, a select set of one or more links that are individually associated with a corresponding source in the plurality of sources that have the highest rating value amongst the plurality of sources that are displayed, the select set of one or more links excluding the at least one link that is most prominently positioned relative to the other links;

wherein presenting the select set of one or more links in prominence includes (a) displaying the qualitative graphic that is representative of the highest rating value with or adjacent to only the select set of links, while (b) not displaying the qualitative graphic with links that are not in the select set.

\* \* \* \* \*